United States Patent [19]

Palma

[11] 4,168,439

[45] Sep. 18, 1979

[54] WIND TURBINE

[76] Inventor: F. Neto Palma, 263 Keele St., Toronto, Canada

[21] Appl. No.: 855,186

[22] Filed: Nov. 28, 1977

[51] Int. Cl.² .............................. F03D 9/00; F03D 3/14
[52] U.S. Cl. ........................................ 290/44; 290/55; 416/111
[58] Field of Search .................... 290/44, 55; 416/111, 416/119

[56] References Cited
U.S. PATENT DOCUMENTS 3,902,072  8/1975  Quinn .................................. 416/111

FOREIGN PATENT DOCUMENTS 944152  3/1949  France ................................. 416/111

Primary Examiner—Gene Z. Rubinson
Assistant Examiner—John W. Redman
Attorney, Agent, or Firm—K. Maxwell Hill

[57] ABSTRACT

The following specification discloses an improvement in vertical axis wind machines having upstanding blades. The blades are attached to a rotatable ring which support the blades at an angle of forty five degrees to the horizontal plane of the ring. Associated with the wind machine is a wind velocity sensing device producing electrical signals responsive to the wind velocity. Means is provided the blades attached to the ring to adjust the angle of attack of the blades in response to the magnitude of the signals.

1 Claim, 5 Drawing Figures

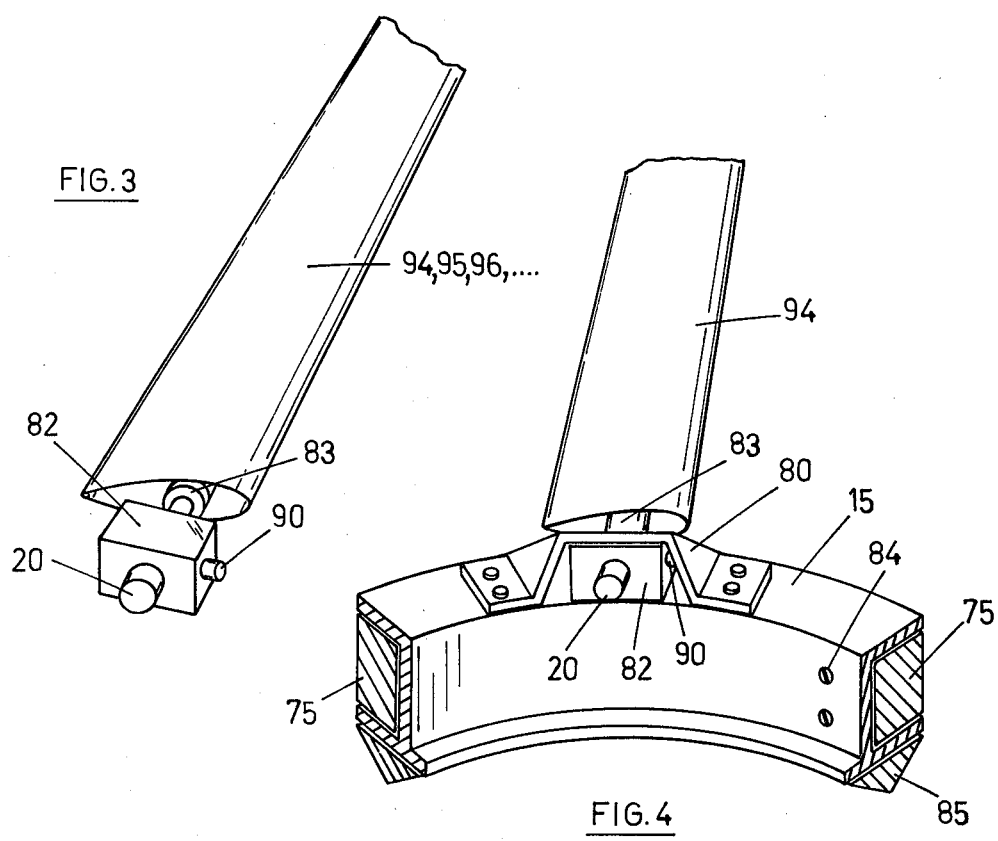
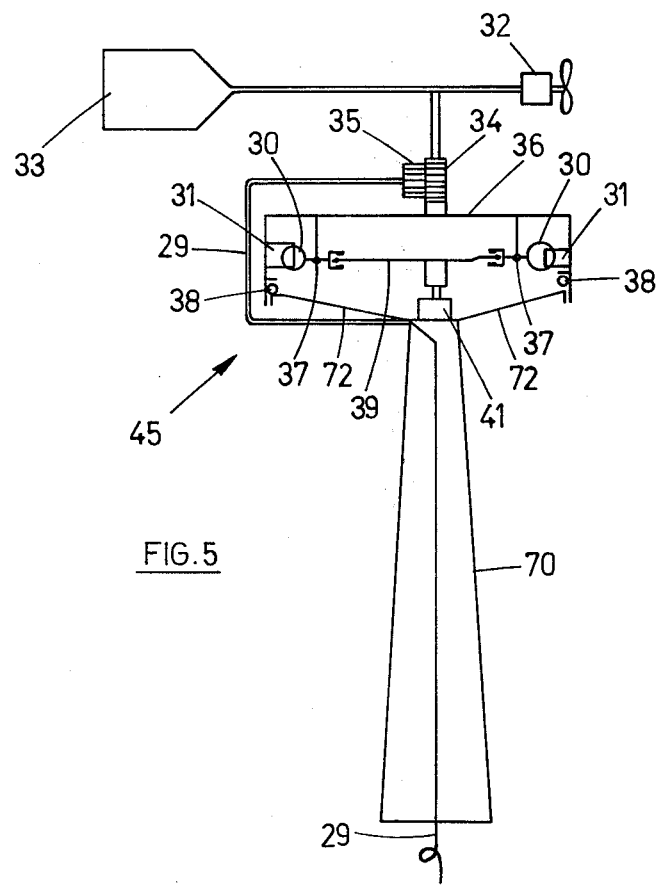

WIND TURBINE

BACKGROUND OF THE INVENTION

1. Field of the Invention

The present invention relates to a wind powered turbine of the vertical-axis type for use in large configuration.

In particular, the invention herein contemplates the provision of a self-starting, free-standing, vertical-axis type rotor which employs pivoted airfoil blades, assembled on a circular rotor frame. The angle of attack of the pivoted blades is monitored and controlled in reference to the prevailing winds, for improved aerodynamic efficiency. RPM control and arrest of operation by aerodynamic means is also provided by a controller operating the pivoted blades, permitting the turbine to operate in very high wind speeds. The rotor base terminates on a ring shaped tower mounted to guiding wheels, disposed in a circular pattern on pillars. The revolving ring shaped tower base forms the armature of an energy converter by electromagnetic induction, allowing the rotary energy to be harnessed directly, at ground level on a stationary installation, thereby limiting the weight to be carried by the rotating turbine.

2. Prior Art

The Darrieus rotor under development by the National Research Council in Canada and Sandia Laboratories in the U.S.A. is a vertical-axis rotor employing airfoil blades bent into a catenary shape and using electric motors or Savonious rotor starting. While simple, the prior methods lack versatility and aerodynamic efficiency. The feasibility of scaling-up to super giant turbines is not possible with known types of vertical-axis turbines.

The Giromill concept employing symetrical blades of constant chord, which are flipped from a positive to a negative orientation at diametrically opposite points, requires strong winds to start, is difficult to operate at constant RPM and is less efficient than the Darrieus rotor. Giromills do not permit scaling-up to large individual installations.

The Vortex-turbine concept is a complex structure, which requires considerable amounts of material and labor, offers an enormous impact surface to the wind forces and could therefore prove relatively vulnerable and uneconomical.

The propeller is a horizontal-axis device of good aerodynamic efficiency, but it requires a tall tower and orientation into the wind, consequently it is not comparatively feasible for large scale energy conversion.

SUMMARY OF THE INVENTION

It is an object of the present invention to provide a self-starting, free-standing, vertical-axis turbine capable of starting in low wind speeds. The turbine herein starts as a drag-type rotor in which the pivoted blades are switched from on to off to on until sufficient speed is achieved. The pivoted blades are next aligned for lift type operation, allowing the turbine to speed-up to a high velocity. I provide a control means to the pivoted airfoil blades in response to signals produced by a blade pitch control mechanism, to provide a signal for pitch control of the pivoted blades, in phase with the prevailing winds.

A further object is to provide a rotor frame which permits the building of large scale wind turbines and form a giant electromagnetic energy converter in which a ring shaped tower base forms a revolving armature common to a number of plug-in individual stators disposed adjacently to it in a circular pattern, for transfer of the energy by electromagnetic induction at ground level. An alternate method of coupling the energy is to directly couple the energy converters to individual guiding wheel shafts.

A further object is to provide a controller for allowing precise control of the turbine and switching of the individual energy converters in reference to the prevailing winds. The controller features a selection of Manual, Automatic and radio control signals by means of a transceiver, allowing the turbine to be monitored and controlled by radio from great distances, such as would be possible by a central computer and a satelite channel supervising a number of large wind turbines scattered over a wide area.

It is further contemplated that the turbine herein can be used for hydraulic applications. The turbine structure herein allows large diameter turbines to be built where the length of the blades may be chosen to suit the application.

BRIEF DESCRIPTION OF THE DRAWINGS

An embodiment of the invention will now be described by way of example with reference to the accompanying drawings in which;

FIG. 3 shows the coupling of the blade to a servo motor.

FIG. 4 shows part of the ring in section with a blade mounted to it.

FIG. 5 is a schematic section of a blade pitch modulation in reference control mechanism which controls the angle of attack of a blade according to the wind speed.

THE PREFERRED EMBODIMENT

Figure 1:
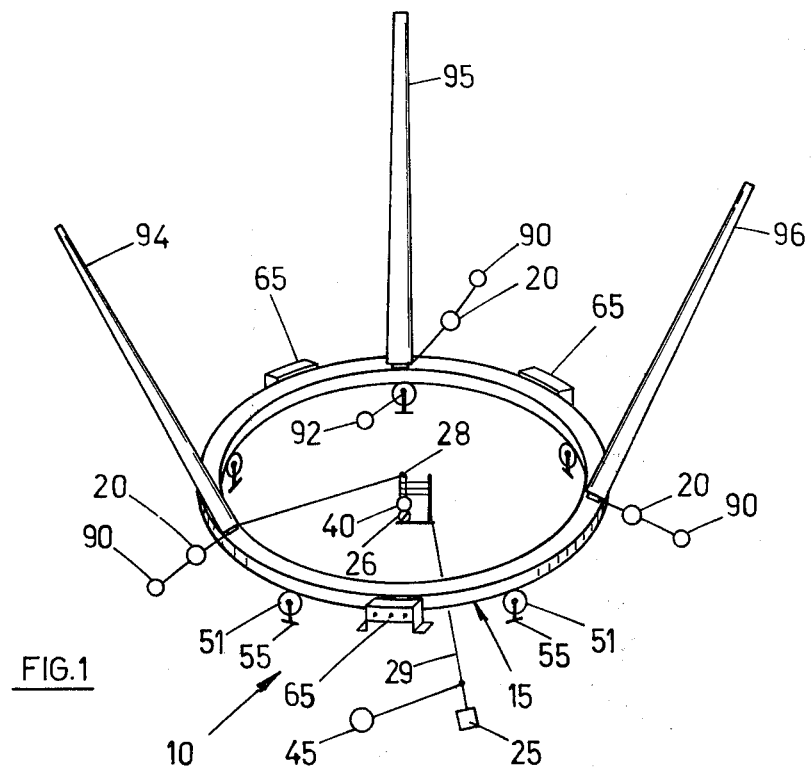
FIG. 1 is a partly schematic illustration of a turbine rotating tower showing the disposition of the blades and wheeled and tracked base.

The turbine is generally designated 10 in FIG. 1, and consists of pivoted airfoil blades 94, 95, 96 mounted on ring shaped frame 15. Frame 15 also forms the armature of an electromagnetic energy converter rotating on wheels 51, mounted on pillars 55 which form the circular conveyor for the turbine rotar. Circles 20, represent electric servo motors which has clutch and gear reduced to permit pitch control of the pivoted airfoil blade 94, 95, 96 in response to control signals provided by a controller 25. Circles 90 represent pitch reference servos, such as servomechanisms to indicate the relative position of the pivoted blades. Circle 26 represents a tachometer to provide controller 25 with the RPM of the frame.

28 is a rotary coupling consisting of rings and brushes mounted at the center of the rotating frame allowing coupling of the servo motors 20, and pitch reference servos 90, to controller 25 by means of cable 29, which also interconnects tachometer 26, coupled to the rotating frame 15. It is contemplated that Controller 25 will permit the remote control of the turbine according to a pre-set program such as starting up and switching the blades in sequence, all with reference to the prevailing winds.

Figure 2:
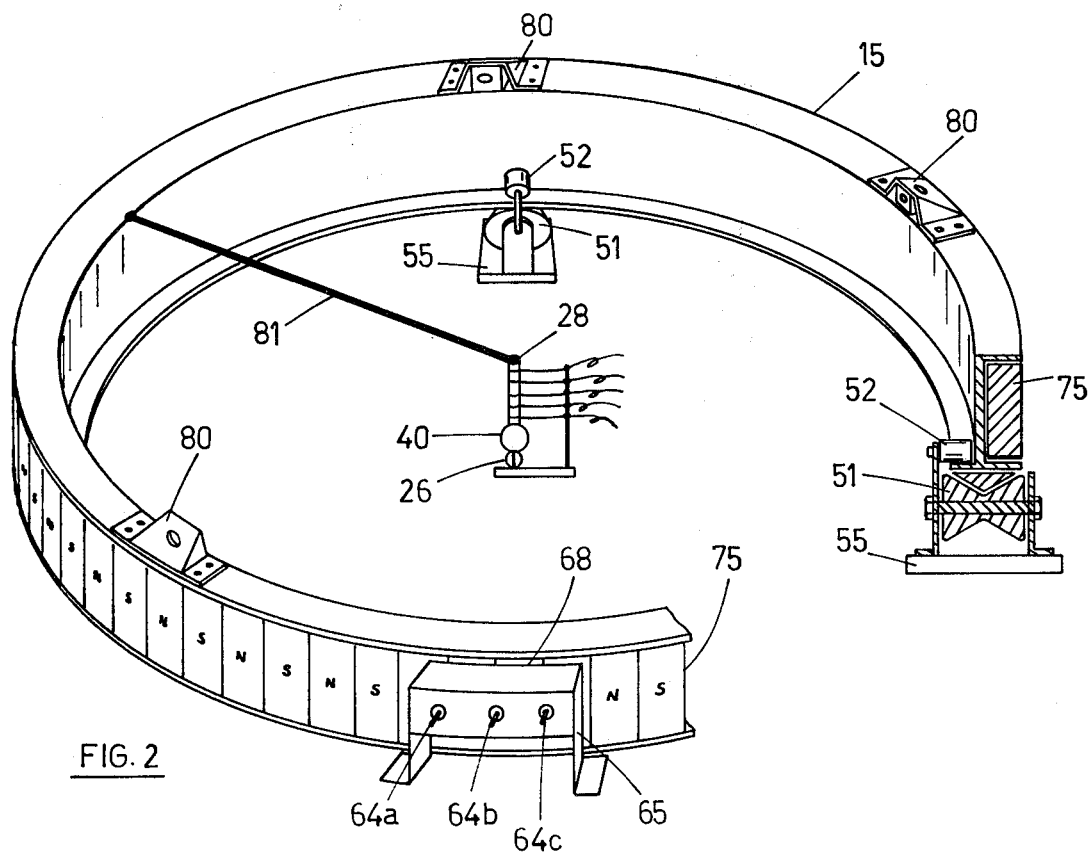
FIG. 2 is an enlarged view of the ring armature showing the three phase pick off and brush assembly at the center of the ring.

A section of frame 15 is shown in FIG. 2 with permanent magnets in a ring armature (75). The magnets in alternate polarity will induce voltage for the pickoffs 65 as the armature is driven by the wind blown blades and with a specific gap 68. A three phase output 64a, 64b, 64c, is shown at pick off 65. Clamping rollers 52 hold wheels 51. The blades are held to the frame by brackets 80. A wire duct 81 of airfoil shape carries the wiring to the blade servos. 82 is a gear reducer comprising an electric clutch operating in oil. Servo motor 20 provides the necessary torque for pitch control of the blade while pitch reference servo 90 provides relative angle information. 83 is a hub bearing.

In FIG. 4 bolts 84 maintain the magnets 75 to frame 15 and 85 is a wedge shaped track that can be replaced when worn. Numeral 92 in FIG. 1, is a disc brake mounted on the guide wheel shafts to permit mechanical braking of the frame.

FIG. 5 shows a blade pitch modulation mechanism generally designated 45, comprising a servo receiver 41, which is electrically interconnected to servo 40 of FIGS. 1 and 2. Servo receiver 41 operates cam 39 solidly mounted to its shaft to permit pick-off coils 30 to move up and down, into primaries 31. Cam 39 rotates in synchronism with servo 40, which in turn is locked to the turbine rotor. 37 is a pivot for the pick-off coils 30. 36 is a cover cap frame which holds the primaries 31, pick-off coils 30 and pivots 37, and is mounted on a baering 38 which rests on a stationary base 72. Each individual pick-off assembly comprising of 30, 31, 37, corresponds to an individual pivoted blade 94, 95, 96, and is disposed in a corresponding disposition. Cover cap frame 36 is oriented in reference to the prevailing wind by means of vane 33, which simultaneously aims anemometer 32, to provide wind speed information. The necessary electrical connections to the rotating part of the assembly are made by means of brushes 35 and collector rings 34. The complete assembly is mounted on a tower 70 at a distance from the wind harnessing turbine, and is interconnected to controller 25, by means of cable 29. The primaries 31 are supplied by an audio frequency source and form a differential transformer with the pick-off coils 30. The profile of cam 39, translates to blade pitch requirements for maximum aerodynamic efficiency of the pivoted airfoil blades, as rotor 15 describes a complete turn.

MODE OF OPERATION

The turbine rotor herein consists of three pivoted airfoil blades mounted on a ring shaped frame, which forms an integral part of the modular electromagnetic energy converter. Very large turbine rotors may use a larger number of blades operating in the same mode.

The blades are mounted to the rotor frame with an outward inclination of 45 degrees to the horizontal plane, to provide a maximum sweeping area for a given blade length. The outward inclination also permits a greatly reduced centrifugal bending stress that would otherwise be present, if the blades were operated in a vertical plane. By inclining the blades at a 45 degrees, the centrifugal stress tends to align itself with the longitudinal axis of the blades, and to a great extent is transferred into tensile stress. Therefore, the blades will experience a combination of centrigugal and tensile stress, which in very large diameter rotors is not of great concern, since the angular momentum is inversely proportional to the increased rotor diameter. Since the blades are inclined they also project a reduced impact surface to the lateral wind forces, which is of particular concern in the off mode of operation.

The ring shaped rotor frame 15, is free to rotate on guiding wheels 51, disposed in a circular pattern on pillars 55. The pivoted airfoil blades 94, 95, 96, have a 360 degrees freedom of rotation and their relative angle of attack is monitored by reference servos 90. The central controller 25 interprets and in turn provides the necessary control to the individual servo motors 20 in reference to information received from the blade pitch modulation mechanism. By allowing a 360 degrees freedom to the pivoted blades and by allowing them to align with the prevailing winds, the impact surface offered by the blades will be small when the turbine is stopped; thus making the turbine virtually invulnerable to hurricane force winds.

The controller 25 features a selection of manual, automatic and radio signals control. The manual and radio control mode of operation allows the operator to duplicate all the functions provided in the automatic mode. To start the turbine in the automatic mode, the blade pitch modulation mechanism 45, will provide the controller with the prevailing wind speed. According to a program setting of say wind speeds in excess of 'X'Km/H, if this condition is exceeded, the following will occur. First a mechanical brake 92 is released. Next, the controller aligns the pivoted blades to their respective null position (a position of minimum drag at high speed of operation). When this has been achieved, the controller will switch to the next phase, which allows 90 degrees of freedom of the blades, permitting them to switch ON and OFF, and the turbine to start as a drag turbine. At a conventional rotor speed, as monitored by the tachometer, the controller will switch to the lift type of operation. In doing so, the controller will once again bring all the blades to a null, and their relative angle of attack will, from then on, be controlled in reference to their respective pick-offs 30 in order to achieve maximum aerodynamic efficiency. Motor starting, by applying power to the stationary pick-offs, is also a practical method, which can be used individually or in combination with aerodynamic starting.

The turbine herein envisages large scale energy harnessing, in the range of hundreds of megawatts. The present energy converter is an integral part of the wind energy harnessing rotor. The giant ring shaped armature is common to a number of pick-off stator modules, thus, forming a giant energy converter by electromagnetic induction, capable of very large capacity. The individual stator pick-offs 65, may be disposed adjacently to the revolving armature at convenient intervals and may be switched ON and OFF independently from each other. They can also provide a variety of output voltages, number of phases, and be of different power ratings. Therefore, forming an energy converter of highly versatile characteristics, which can be scaled-up to convert energy far in excess of the prevailing mean wind speeds, at a minor additional cost.

The unconventionally large diameter armature formed by the ring shaped rotor frame will have a diameter of approximately ⅓ of that projected by the rotor blade tips. This will provide good rotor stability and a high relative speed of the revolving armature to the stationary pick-offs, which also provide considerable savings in the copper requirements of the pick-offs. Since the revolving armature has a ring shape. it will cause a minimal drag, and consequently, form a highly effective and efficient energy harnessing mechanism of versatile characteristics. The present turbine concept will permit the harnessing of more than the average mean wind speeds, provided that the electromagnetic pick-offs are rated in excess of that average. Such feasibility offers a higher order of wind power integration. Also, the pivoted airfoil blades which are modulated in reference to the prevailing wind speed, permit better rotor efficiency. The integral electromagnetic converter, also offers improved efficiency, since the need for gear boxes has been eliminated. Extra pick-offs may optionaly be installed and switched ON, on a demand basis to convert energy in excess of the average wind speeds, at a small additional cost. The large diameter ring shaped rotor base, gives the assembly a reassuring appearance of safety, since it rotates on a wide base. The rotor will operate at a high blade tip ratio, since the modulation of the blades permit a higher efficiency and the pivoted blades to choose a proper angle of attack to effect a higher operating speed.

The multiple output shaft, provided by the individual guiding wheels, offers an alternative for mechanical energy, which can be coupled to a variety of energy converters, to permit conversion of the wind energy to a variety of energy forms simultaneously, economically and efficiently.

The pivoted airfoil blades are operated by a servo motor, through a gear reducer comprising an electric clutch and blade pitch reference servo enclosed in the same housing and operating in oil, for long operating life. The blade pitch control mechanism permits precise control of the blades to any angle, allowing tuning of the rotor for a constant RPM in a wide range of wind speeds, and also aerodynamic braking of the rotor by orienting the blades for the purpose. In the 'OFF' mode of operation, the electric clutches are switched off and the pivoted blades become free to naturally align with the prevailing winds. For safety, and in the eventuality of winds in excess of those prescribed by design, such as would be the case of hurricanes and tornados, the rotor frame is made heavy in weight and is clamped by rollers, allowing it to easily survive. The rotor will be shielded by a non-metalic shield to prevent undesirable induction and prevent magnetic particles from becoming attached to the permanent magnets of the armature. Air will provide adequate cooling for the giant ring shaped armature. The stator pick-off modules can easily be cooled by heat pumps, driven by the guiding wheel shafts.

While in the automatic mode of operation, assuming the wind speed drops below a programmed speed to sustain a specific RPM, the controller will automatically switch to the drag type of operation in which the pivoted blades will be free to rotate within a 90 degree frame. A down-timer may be programmed to switch the turbine to the arresting mode of operation, if the turbine did not pick-up operational speed within that period.

The arresting of operation mode will consist in offsetting the pivoted blades 45 degrees from the null. In this mode, the pivoted blades will operate as aerodynamic brakes. After the turbine has come to a stop, a mechanical brake 92 may be applied to ensure a stationary condition of the rotor frame, thus completing a cycle. After the turbine has come to a full stop, while in the automatic mode, it will switch to a 'stand-by mode,' in which the anemometer 32 will monitor the prevailing winds. Should the wind speed at any time exceed the minimum preset program, an integrator timer is programmed for a specific integration time, to prevent the turbine from initiating a starting cycle in gusting winds of low frequency.

It will be noted that this turbine herein combines the necessary versatile features to out-class the co-efficient of utilization, the variants of power regulation and speed offered by the propeller. While the blades herein do not produce a continuous torque, the whole length of the blades operate in a higher energy region, for a given rotor diameter. In particular, the length of the blades and their relative distance from the centre, will to a great extent determine rotor efficiency in comparison. On the other hand the propeller produces a continuous torque, but only its blade tips operate in a high torque producing region, for any given rotor diameter.

Small scale wind turbines of a few kilowatts are also practical. However, they would likely have fixed blades and be started by the pick-offs in the reverse mode of operation. The rotor would also need to be elevated by a tower. Such small scale rotors would display similar characteristics to those of the Darrieus rotor. However, they will prove more efficient and economical for any given rotor size and power rating.

What I claim is:

1. In a vertical axis wind machine having a plurality of upstanding airodynamic blades the combination comprising;

a rotatable ring pivotably supporting said blades;

a wind velocity sensing device adapted to produce an electrical signal responsive to wind velocity;

means for pivotably adjusting the angle of attack of said blades responsive to said signal; and wherein said ring rides on wheels disposed on a circular track and mounted on pillars, said ring composing a frame for a ring shaped armature on which permanent magnets of alternate polarity are mounted to form an electromagnetic energy converter, said armature having a plurality of pick-off stator modules mounted adjacent thereto to allow transfer of the electro induction current direct to cable means at ground level; said guide wheels having shafts to provide coupling to mechanical energy converting means.

* * * * *